US006871011B1

United States Patent
Rahman et al.

(10) Patent No.: US 6,871,011 B1
(45) Date of Patent: Mar. 22, 2005

(54) PROVIDING QUALITY OF SERVICE FOR DISKS I/O SUB-SYSTEM WITH SIMULTANEOUS DEADLINES AND PRIORITY

(75) Inventors: Mahfuzur Rahman, South Brunswick, NJ (US); Ibrahim Kamel, Monmouth Junction, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1098 days.

(21) Appl. No.: 09/672,916

(22) Filed: Sep. 28, 2000

(51) Int. Cl.[7] ................................................ H04N 5/91
(52) U.S. Cl. ...................................... 386/125; 386/126
(58) Field of Search .............................. 386/46, 70, 83, 386/95, 125, 126; 711/151, 167

(56) References Cited

U.S. PATENT DOCUMENTS

| | | | |
|---|---|---|---|
| 5,956,321 A | 9/1999 | Yao et al. | |
| 6,023,720 A | 2/2000 | Aref et al. | |
| 6,049,332 A | 4/2000 | Boetje et al. | |
| 6,078,998 A | 6/2000 | Kamel et al. | |
| 6,182,197 B1 | 1/2001 | Dias et al. | |
| 6,370,323 B1 * | 4/2002 | Adolph et al. | 386/104 |
| 6,496,899 B1 * | 12/2002 | DeMoney | 711/112 |
| 6,601,237 B1 * | 7/2003 | Ten Kate et al. | 725/47 |

FOREIGN PATENT DOCUMENTS

| | | |
|---|---|---|
| JP | 2000048001 | 2/2000 |
| WO | WO00/54161 | 9/2000 |

OTHER PUBLICATIONS

I. Kamel, T. Niranjan, S. Ghandeharizedah, "A Novel Deadline Driven Disk Scheduling Algorithm for Multi–Priority Multimedia Objects", Data Engineering, 2000. Proceeedings. 16th International Conference on San Diego, CA, USA, Feb. 29–Mar. 3, 2000.

* cited by examiner

*Primary Examiner*—Huy Nguyen
(74) *Attorney, Agent, or Firm*—Harness, Dickey & Pierce, PLC

(57) ABSTRACT

The disk scheduling algorithms try to service a request with lower priority and strict deadline only if serving this request is not going to violate the deadline constraints of a higher priority request. One of the algorithms uses a single queue to hold all the requests regardless of their priority. The single queue is reorganized after the arrival of a new request according to the order requests would be serviced. A second algorithm uses multiple queues. Each queue holds only requests with the same priority, and the requests in each priority queue are sorted according to their deadlines. The decision of servicing a request is made at scheduling time.

10 Claims, 4 Drawing Sheets

PROVIDING QUALITY OF SERVICE FOR DISKS I/O SUB-SYSTEM WITH SIMULTANEOUS DEADLINES AND PRIORITY

BACKGROUND AND SUMMARY OF THE INVENTION

The present invention relates generally to disk storage technology. More particularly, the invention relates to a set of improved disk scheduling and disk access algorithms for improving input/output performance. The improved algorithms may be used in a variety of disk access applications. They are particularly useful for multimedia servers which must supply video and audio streaming data in real time.

The use of multimedia servers has been growing rapidly as the public discovers more needs to store and retrieve different types of multimedia objects, e.g., text, images and video. For example, currently many state-of-the-art video editing stations use server-based technology to store and retrieve the multimedia content being worked on. Video on demand delivery systems also use similar server-based technology to deliver video to distribution sites or end user sites. As the Internet access bandwidth increases, server-based technology will be increasingly used to deliver multimedia content over that medium as well. Given adequate bandwidth, this multimedia content can be interactive—the user will be able to interact with and, to some extent control, what he or she sees.

The requirements to store and retrieve multimedia objects typically depends on the type of object being stored or retrieved. For real time streaming of video and audio data, many users require the data to be delivered within a specific deadline. If the server misses the deadline, and thus fails to deliver a particular video frame, that frame is no longer treated as needed. However, losing frames in video play back will result in jitters in the display. So real time applications, such as video playback, specify a performance guarantee, i.e. a data block should be available by a specific time. In contrast, a "best efforts" application, such as word processing application, does not typically require any performance guarantees. Thus deadline is an important parameter to consider when providing quality of service in a multimedia application; it is not so important in a word processing application.

Another important parameter for multimedia applications is priority. For example in a multimedia server application, different video clips might be assigned different priorities; and higher priority clips need preferential treatment over the lower priority ones. It is possible, for example, to devise a delivery system where premium subscribers get preferential treatment over non-premium subscribers. In a nonlinear video editing station, for example, certain critical editing operations may require high quality data feeds, whereas other less critical operations may be able to tolerate lower quality feeds.

Applications, such as real time multimedia delivery applications, that place attention on both deadline and priority have proven quite challenging for the designer of server-based storage and retrieval systems. Even with the today's high speed, high bandwidth server technology, there are still inherent tradeoffs in meeting both deadline and priority requirements. Which data is stored or retrieved first, and which data must be made to wait are fundamental issues that lie at the heart of many real time data delivery system designs. System designers employ various disk scheduling algorithms to handle these issues.

Prior approaches to disk access scheduling fall into two categories, based on whether the algorithm tries to minimize the disk seek time or tries to serve requests with deadline and priority requirements, treating the seek time as negligible compared to transfer time. Ignoring seek time is a valid assumption when we consider applications such as continuous media server, digital library or video editing system where clients make requests for data in large block sizes.

Some algorithms for multimedia applications employ cycle-based techniques designed to guarantee delivery of data in support of a jitter-free display. Cycle-based algorithms partition requests into groups and sort requests in each group according to the physical location of the data on the disk. They typically do not associate a deadline with the request. Instead, they break a cycle into slots, with each slot supporting a single display. Interactive applications are particularly challenging because users expect prompt response to their interactive input (similar to the response they experience when using other computer applications). Interactive application users notice excessive disk access latency immediately and do not like it. To address this, some have proposed offering higher performance level guarantees for interactive input requests than for more routine periodic requests.

Traditional deadline driven algorithms, such as Earliest Deadline First (EDF), SCAN-EDF and SCAN-RT, do not consider different priority levels. Instead they provide a soft real time delivery guarantee. One proposed variation of EDF with multiple queues takes into account of different priority levels. This variation of EDF has separate queues for each priority levels and requests are sorted according to deadlines in each priority queue. However, the algorithm used by this EDF variant will always take a request from the highest priority queue unless it is empty, in which case it will go to the next priority queue and so on. One disadvantage of this algorithm is that the low priority requests will suffer from starvation from this algorithm.

The present invention provides a set of algorithms to solve this starvation problem. The set of algorithms are deadline driven, but they also consider different priority levels. The algorithms will attempt to service a request with a lower priority and strict deadline only if serving this request is not going to violate the deadline constraints of a higher priority request. Two embodiments are illustrated and described. One embodiment uses a single queue to hold all the requests regardless of their priority. Another embodiment uses multiple queues. Each queue holds only requests with the same priority and the requests in each priority queue are sorted according to deadline.

For a more complete understanding of the invention, its objects and advantages, refer to the following specification and to the accompanying drawings.

DESCRIPTION OF THE PREFERRED EMBODIMENTS

Introduction—Real-Time Delivery Considerations in Multimedia

Figure 1A:
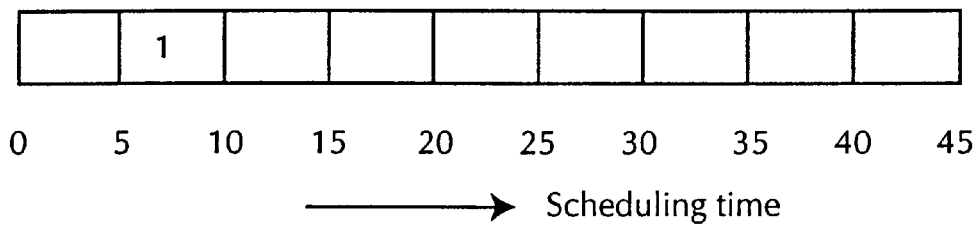
FIGS. 1*a*-1*f* are data structure diagrams illustrating a presently preferred single queue embodiment under various stages of the associated algorithm for that embodiment.

The disk scheduling algorithms of the present invention may be used in a variety of different applications. Because multimedia applications present some of the greatest challenges, the invention will be described in the context of a multimedia server application that needs to account for both deadlines and priority. The choice of the multimedia application example should not, however, be viewed a limitation upon the scope of the invention, for the invention has many uses besides multimedia applications.

Multimedia applications that take into account both deadlines and priority include non linear video editing stations, digital library servers, video servers, video on demand servers, interactive video servers and the like. These types of applications may involve both video and audio storage and retrieval, and may, in turn, have both deadline and priority requirements.

The digital library application, for example, may involve both continuous media, such as streaming video and audio, and also the more traditional, non-real-time data, such as text, images, ASCII text and scanned documents. In such a digital library application, the continuous media data may need to be delivered within strict deadlines, some of it with high priority as well. Conversely, the non-real-time data may not have deadline requirements and are usually given lower priority than video and audio data. Thus a request to access a data block in a digital library application may come with a real time component (with deadline) and a non-real time component (with an infinite or very large deadline) and priority. Implementing a disk scheduling algorithm to support this type of application dictates that the algorithm take both of these parameters into account, which in turn will dictates a given quality of service. The scheduling algorithm should ensure that low priority or non-real time data does not suffer from starvation.

Video editing stations and video on demand servers also have the requirements of deadline and priority in providing streaming video clips in real time. Sometimes, it can be necessary to play back multiple video streams simultaneously, and these streams may have different real-time deadline requirements. Also some video frames might have higher priority than others. Video servers also need to provide real time guarantees for continuous media data. Moreover, for a video on demand application different levels of quality of service could be provided based on price.

Consider a video server application offering three levels of priority: high, medium and best effort. Customers ordering high-quality services will be charged more than those ordering medium or best effort services. To provide the requested quality of service, the disk scheduling algorithm should favor the high priority requests and try to service them within their deadline. Thus the scheduling algorithm for disk requests that store and retrieve video and audio frames in a video server, or a video on demand server, should be able to take both of these factors into account while making intelligent decisions to improve the disk I/O performance, and also while providing preferential services to different customers based on prices.

Internet-based systems that supply MPEG encoded video data offer another example where both deadline and priority can be important. The MPEG data is stored in an interleaved sequence of Intra, Predictive and Bi-directional (I, P, and B) frames. In this application the request scheduler should always try to favor I frames, as losing I frames would introduce more jitter in the display than losing P or B frames. Thus these different frame types need different deadline and priority treatment.

In each of the preceding examples neither deadline nor priority alone is wholly sufficient to model an application's requirements for disk access requests. An algorithm that considers both deadline and priority is needed to efficiently schedule disk I/O requests.

The Scheduling Algorithms

The present invention provides a set of scheduling algorithms that are optimized to service requests with real time deadlines and priorities. As will be more fully described, these algorithms make decisions based on the deadlines of each request and ignore the relative position of data on the disk. It might be argued that ignoring relative position could involve significant seek time and rotational latency overhead. However, for multimedia applications, and other target applications, where data is accessed in large chunks, this overhead will be small compared to the transfer time. Target applications include video servers, video-editing stations, and digital libraries. All of these involve large block size requests typically around one megabyte per block or greater. For such requests the seek time becomes relatively small compared to the transfer time.

The scheduling algorithms of the invention may be implemented as a set of algorithms. Presently preferred are two algorithms, both of which take deadline and priority into account. The main difference between the two algorithms is that one uses a single queue to hold and schedule the incoming requests, whereas the other uses multiple queues. Both algorithms are deadline-driven with multiple priority levels. As will be illustrated, both try to service requests so that requests with low priority get service as long as they don't violate the deadline constraints of higher priority requests. The algorithms also try to minimize the number of requests missing deadlines. In the single queue embodiment the queue is reorganized after the arrival of each request according to the order requests would be served. In this reordered list there could be requests of lower priority on top of requests with higher priority as long as the system can service all the requests in the queue.

The multiple queues embodiment places only requests with the same priority in a given queue and the requests of each priority queue are sorted according to their deadlines. Traditional multiple queue algorithms start by taking requests from the highest priority queue and then proceed to a lower priority queue only if higher priority queues are empty. In contrast, the multiple queue embodiment of the present invention uses built-in intelligence, allowing it to take a request from a lower priority queue even if there are requests in the higher priority queues. This decision of serving a lower priority request is only made if it does not violate the deadlines of any requests in the higher priority queue.

A Single Queue Embodiment

In the single queue embodiment a single queue holds all the requests and this queue is always organized according to scheduling order. We refer this queue as a request queue. By scheduling order it is meant that the requests are sorted according to the scheduling time they would be expecting to be serviced.

The scheduler always takes a request to serve from the head of the queue even if the request at the head of the queue has a scheduled time later than the current time. The requests are ordered during insertion time. The single queue algorithm schedules a request as late as possible keeping slacks at the beginning so that we can insert any new requests with stricter deadlines. In the process of inserting a new request with strict deadline and high priority, the algorithm may need to delete some of the lower priority requests. This is permitted. There can be requests of lower priority in the queue before the higher priority requests so long as lower priority requests do not violate the deadline constraints of the higher priority requests. The preferred embodiment assume a fixed size block where the block size is large (about one megabyte) so that the transfer time is large enough to ignore seek time.

Each entry in the queue is a tuple of 4 elements (scheduling time, deadline, priority, service time). A request always has a deadline and priority associated with it. When we get a request r (priority, deadline) we convert it into R (scheduling time, priority, deadline, service time). Scheduled time is the latest schedule time for a request and it can not be served later than that. We calculate scheduling time according to the following rule:

Scheduling time=deadline−service Time

This scheduling time is the time the request is scheduled initially and as time goes on and the queue gets filled with new requests the scheduling time changes and the queue is always organized according to scheduling time. Service time is the time to transfer a fixed size block, typically on the order of one megabyte in a multimedia server.

Single Queue Algorithm and Example

The first step of the algorithm is to insert a request into the queue. Upon arrival of a new request the algorithm scans the request queue to find a proper place to insert it according to scheduling time and priority. In the process of inserting a new request the algorithm might delete an element from the queue to make room for a higher priority request. When servicing a request we always take the first element of the queue to serve, as that is the candidate with the strictest deadline. The queue is always ordered according to the scheduling time. Therefore, let us consider that the new request is denoted as $R_{new}$ The insertion of a request into the queue follows the following procedure:
1. Find a place for $R_{new}$ to insert into the queue according to scheduling time.
2. While scanning the queue for inserting the new request mark a lowest priority request if it exists. This marked request will always have priority lower than the priority of the new request. The marked request is the possible candidate to be removed from the queue if needed.
3. If inserting $R_{new}$ violates the deadline of one or more higher priority requests and there is a marked request, delete the marked request and insert the new request into its proper place; otherwise throw away the new request.
4. Update the scheduling time of all the requests preceding the newly inserted request if two or more requests have the same scheduling time.

The algorithm for updating the scheduling time is as follows, where the request the new request is designated $R_k$:

```
While ((scheduling time(R_k) = scheduling time(Rk-1) ) and (not head of the queue))
{
    scheduling time(R_{k-1}) = scheduling time(R_{k-1}) - service time
    k = k - 1;
}
```

Let us consider an example for the algorithm described above. In the example we have the following requests at time 0:

| Request | (priority, deadline) |
|---------|----------------------|
| 1.      | (0, 10)              |
| 2.      | (1, 15)              |
| 3.      | (0, 10)              |
| 4.      | (0, 20)              |
| 5.      | (0, 20)              |
| 6.      | (1, 15)              |
| 7.      | (2, 25)              |

For simplicity consider a fixed service time of 5 ms for all the requests. In FIGS. 1a-1f we show the queue content after insertion of each request. We start with the first request and see if it is schedulable. If it is we insert it according to its scheduling time; otherwise we just ignore this request, as we can not serve this request. We continue doing this for all the requests.

Request 1, (0, 10) would be scheduled at time t=(deadline−service time)=(10−5)=5. As the slot at time t=5 is empty we insert this request in this slot. After the insertion the queue content is shown in FIG. 1a.

Figure 1B:
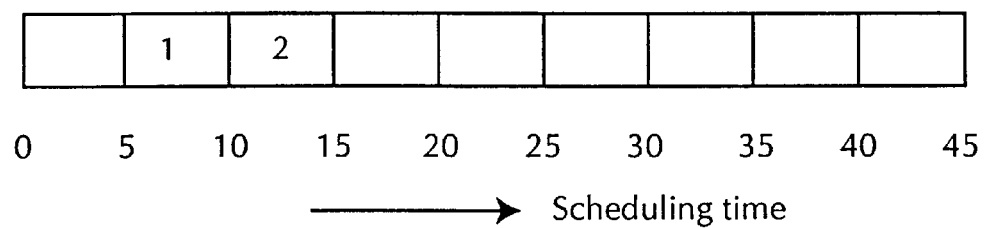

Request 2, (1, 15) would be scheduled at time t=(20−5)=15. The slot is empty there so we insert this request in this empty slot as shown in FIG. 1b.

Figure 1C:
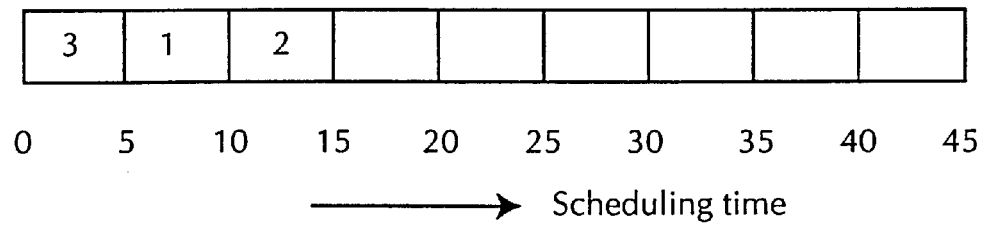

Request 3, (0, 10) should have been scheduled at time t=(10−5)=5 but we already have a request inserted there. According to the algorithm we go up and reduce the scheduling time of request 3 and put it in the first slot. Request 3 is now scheduled at time t=0. The queue content after this insertion is shown in FIG. 1c.

Figure 1D:
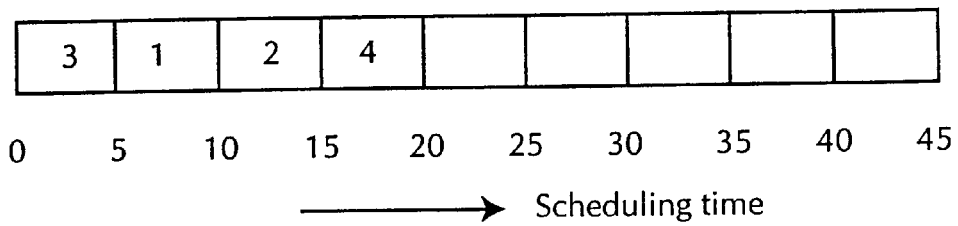

Request 4, (0, 20) should be scheduled at time t=(20−5)=15. This slot is empty so we insert this request in this empty slot. The queue content after this insertion is shown in FIG. 1d.

Figure 1E:
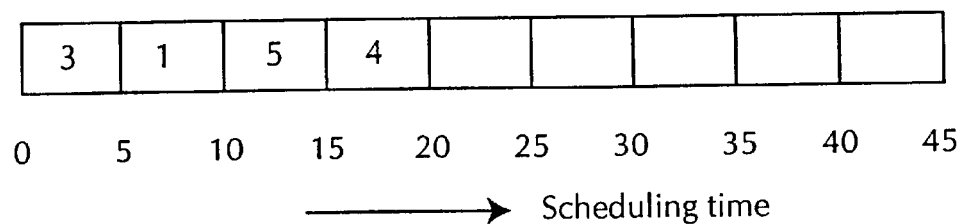

Request 5, (0, 20) should have been scheduled at time t=(20−5)=15 but there is already a request inserted in this slot. We can not insert it there. According to our algorithm we look for lower priority requests inserted before this slots. We see that request 2 has a lower priority than request 5 and so we delete request 2 in order to make a room for request 5 to insert. We also reduce its scheduling time so that the entire queue would be schedulable. After applying all the steps as described in the algorithm, request 5 is scheduled at time t=10. The queue content is shown below after this insertion is shown in FIG. 1e.

Request 6, (1, 15) should have been scheduled at time t=(15−5)=10. But we already have a higher priority request occupying this slot and there are not any requests with priority lower than this request before this slot. We can not serve this request so we just delete this request.

Figure 1F:
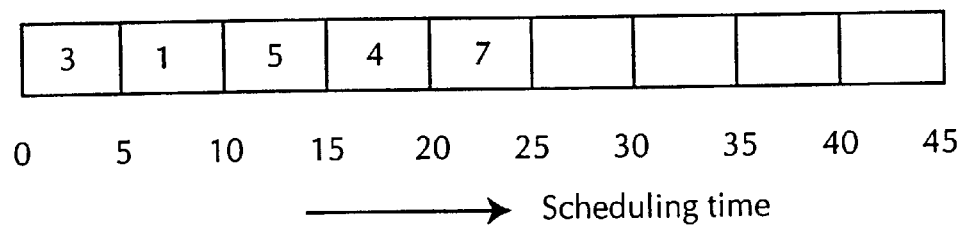

Request 7, (2, 25) should be scheduled at time t=(25−5)=20. As this slot is empty we put this request in this slot. The final queue contents after insertion of all the requests are shown in FIG. 1f.

Multiple Queue Embodiments

The multiple queue embodiment has a separate queue for each priority level and requests in each priority levels are sorted according to deadline. In order to prevent starvation of lower priority requests, the algorithm tries to serve a request from the lower priority queue as long as serving this lower priority request does not violate the deadline of the higher priority requests. This algorithm relies on merging of several queues while making the decision if taking a lower priority request violates the deadline of a higher priority request. The algorithm is outlined below:

Let $R_{new}$ be a newly arriving request with priority i. We insert $R_{new}$ into $Q_i$ according to its deadline and then we do the merging step to determine the new order in which the requests will be serviced. The new scheduling order is stored in queue Q.
Let the priority queues be Q1, Q2, Q3, Q4, ... $Q_k$
Where Q1 is the highest priority queue.
After arrival of every new request the following steps are followed to build a merged queue that is sorted according to scheduling order. By scheduling order we mean the order by which the requests will be serviced.
1. Let Q be the merge queue.
2. Initialize Q=NULL;
3. For( i=1 to k)

```
{
    Let R be the next request in Q_i
    Try to insert R into queue Q according to deadline provided that it
does not violate any higher priority requests.
        If R can not be inserted remove R from Q_i
}
```

Figure 2:
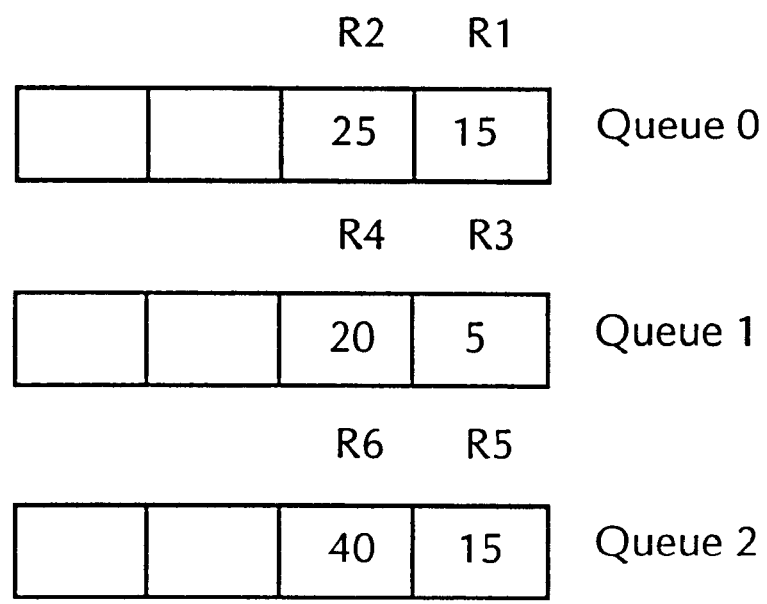
FIG. 2 is a data structure diagram illustrating a presently preferred multiple-queue embodiment with exemplary data, useful in understanding the associated algorithm for that embodiment.

Let us consider an example of the multiple queue approach. Let Queue 0 is be highest priority queue and Queue 2 be the lowest priority queue and assume a service time of 5 msec for simplicity. FIG. 2 illustrates the initial configuration of three exemplary queues (Queue 0, Queue 1 and Queue 2).

Figure 3:
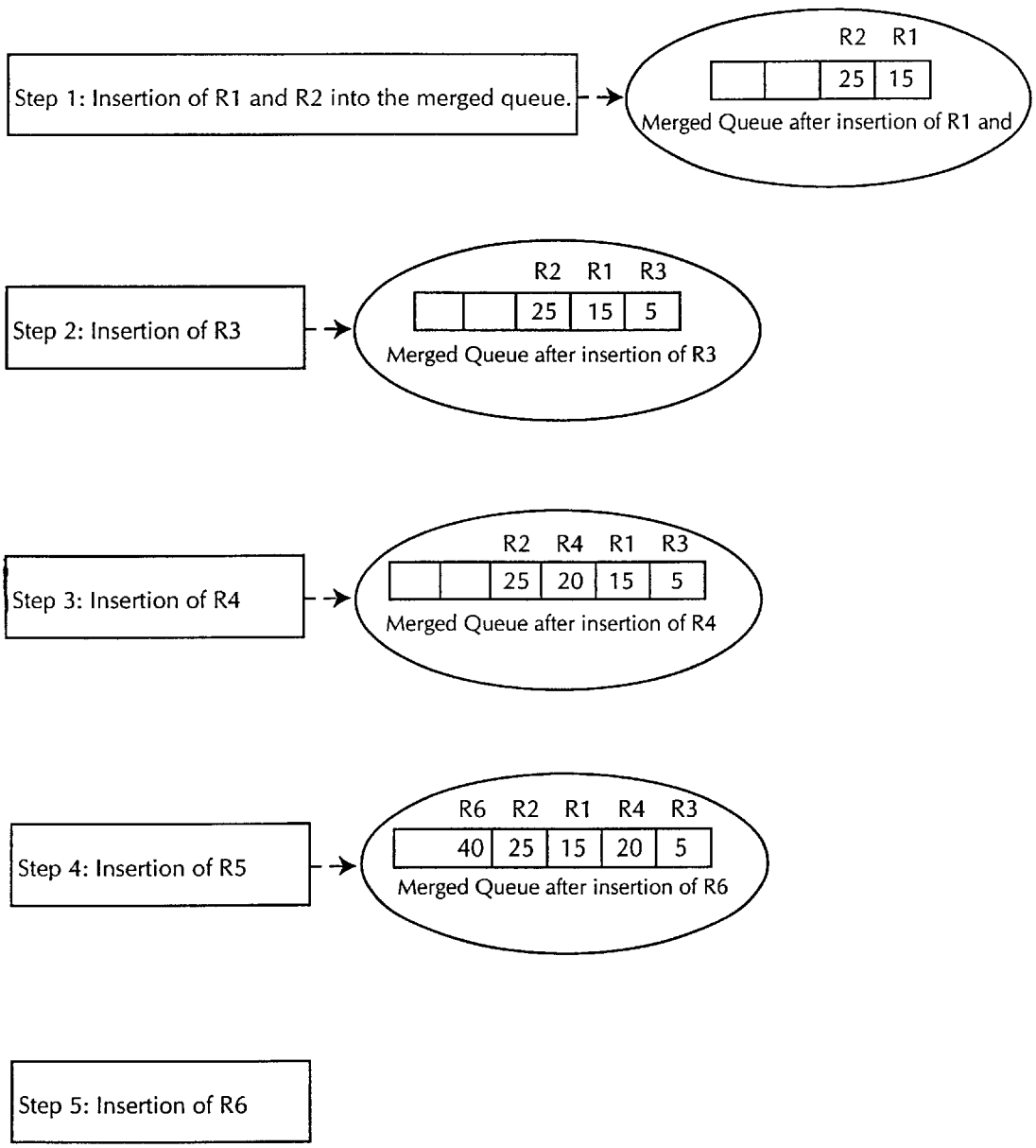
FIG. 3 is a flowchart diagram with associated data structure diagrams, illustrating the algorithm of the multiple-queue embodiment.

The merging of these three queues into a single queue in a scheduling order is shown in FIG. 3 and performed by the following steps
Step 1: Insertion of R1 and R2 into the merged queue.
Step 2: Insertion of R3
Step 3: Insertion of R4
Step 4: Insertion of R5
Note that if we insert R5 then it violates the deadline of the higher priority requests so delete the request R5 from the Queue 2.
Step 5: Insertion of R6

Design Considerations

The two presently preferred algorithms described here each have both advantages and disadvantages. The decision of which to implement will depend on the goals and objectives of the particular system being designed. The single queue embodiment is very easy to implement when block size is fixed, which means service time or transfer time is fixed for all the requests. It requires only O(n) time, where n is the number of requests in the queue. The disadvantage of the single queue embodiment is that when the service time is not fixed special attention may need to be given to ensure deadlines of higher priority requests are met. Thus it may be necessary to mark several lower priority requests to allow the system to delete as many entries as necessary in order to meet the deadline of the new higher priority requests.

Insertion of a request in the multiple-queue embodiment is computationally more expensive. The whole merging process requires O(nk) time in the worst case, where k is the total number of priorities. The multiple-queue embodiment relies on merging multiple queues into a single queue in order to maintain a scheduling order. So every new arrival initiates this merging process. The multiple-queue embodiment thus needs to maintain several queues, including a merged queue, whereas the single queue embodiment needs to maintain only single queue.

From the foregoing, it will be seen that the algorithms of both of embodiments address the starvation problem of lower priority requests and try to service lower priority requests even if there are some higher priority requests in the queue. As long as the lower priority request does not violate the deadline of the higher priority requests, the lower priority requests will get handled. To illustrate the success of these techniques below we provide some experimental results.

Experimental Results

We simulated the single queue embodiment and also an earliest deadline first (EDF) algorithm and compared the simulation results of our algorithm against EDF algorithm with multiple priority levels. The disk model for the simulation environment is the following Table 1:

TABLE 1

Disk Model

| Disk Parameters | Values |
| --- | --- |
| Type | Quantum XP32150 |
| No of cylinders | 3832 |
| Tracks/Cylinder | 10 |
| No. of zones | 16 |
| Sector size | 512 |
| Rotation speed | 7200 RPM |
| Disk size | 2.1 GBytes |
| Block size | 1 Mbytes |
| Transfer speed | 4.9–8.2 Mbytes/sec |
| Disks/RAID | 5 (4 data 1 parity) |

In the simulation, we assume that 40–50 users are simultaneously accessing each of the disks. The simulation was performed with 3 priority levels. We also consider that the clients or users are making requests with fixed size block and the block size is 1 megabyte. We compare P-EDF (EDF with multiple priorities) algorithm against our single queue (Single Q) approach to determine the number of lost blocks using each algorithm. The results are shown in the Table 2 below. The results demonstrate the superiority of the inventive algorithms over conventional EDF. Fewer losses were experienced.

TABLE 2

Number of Loss for Three Priority Levels

| Number of users | Priority level 0 | | Priority level 1 | | Priority level 2 | |
| --- | --- | --- | --- | --- | --- | --- |
| | P-EDF | Single Q | P-EDF | Single Q | P-EDF | Single Q |
| 40 | 0 | 0 | 0 | 0 | 0 | 0 |
| 41 | 64 | 2 | 0 | 0 | 0 | 0 |
| 42 | 877 | 723 | 0 | 0 | 0 | 0 |
| 43 | 1772 | 1568 | 0 | 0 | 0 | 0 |
| 44 | 2562 | 2331 | 0 | 0 | 0 | 0 |
| 45 | 3458 | 3200 | 0 | 0 | 0 | 0 |
| 46 | 4223 | 3994 | 0 | 0 | 0 | 0 |
| 47 | 5103 | 4836 | 0 | 0 | 0 | 0 |
| 48 | 5799 | 5578 | 0 | 0 | 0 | 0 |
| 49 | 6690 | 6447 | 0 | 0 | 0 | 0 |
| 50 | 7400 | 7215 | 0 | 0 | 0 | 0 |

While the invention has been described in connection with its presently preferred embodiments, it will be understood that the principles of the invention may readily be extended to other embodiments. The embodiments illustrated here are intended therefore to teach the concepts of the invention and are not intended as limitations upon the scope of the invention as set forth in the appended claims.

We claim:

1. A method of scheduling a new disk access request, comprising:

a. maintaining at least one queue of disk access requests, representing each member in said queue by a data structure that records at least deadline, priority and scheduling time for each member;

b. processing a new request for disk access by determining a scheduling time for said new request based on a deadline associated with said new request;

c. scanning said queue to locate an insertion point for said new request by comparing the scheduling time and priority of said new request with the scheduling times and priorities of other members in said queue, said insertion point being selected such that the deadlines of members of higher priority than said new request are not violated;

d. while scanning said queue in step c, identifying and marking members of lower priority than said new request;

e. inserting said new request into said queue at said insertion point if so doing does not violate the deadline of any member of higher priority than said new request;

f. if in step d one marked member was identified and if inserting said new request into said queue at said insertion point violates the deadline of any member of higher priority than said new request, then deleting said marked member and repeating steps e and f;

g. if in step d at least no marked member was identified and if inserting said new request into said queue at said insertion point violates the deadline of any member of higher priority than said new request, then discard said new request.

2. The method of claim 1 wherein said data structure records a service time for each member corresponding to the transfer time associated with reading said member from the disk.

3. The method of claim 1 wherein said step b of determining a scheduling time is performed by obtaining a deadline associated with said new request and subtracting the transfer time associated with reading a member from said disk.

4. The method of claim 1 further comprising maintaining separate queues of disk access requests for different priority levels.

5. The method of claim 1 further comprising maintaining separate queues of disk access requests for different priority levels and merging said separate queues while making the decision if taking a lower priority request violates the deadline of a higher priority request.

6. The method of claim 1 further comprising updating the scheduling times of each member in said queue preceding said step e of inserting said new request if a plurality of members have the same scheduling time.

7. The method of claim 6 wherein said updating step is performed by adjusting the scheduling time of one of said plurality by an amount related to the service time involved in reading a member from the disk.

8. The method of claim 6 wherein said updating step is performed by first adjusting the scheduling time of one of said plurality by an amount related to the service time involved in reading a member from the disk and by iteratively adjusting the scheduling times of additional members whose scheduling times are caused to overlap as a result of said first adjusting step.

9. The method of claim 1 wherein said members correspond to MPEG video frames classified as intra, predictive and bi-directional frames, and wherein said priorities are assigned to said members according to their frame classification.

10. The method of claim 1 wherein said queue contains members are each represented as a tuple of at least four elements: scheduling time, priority, deadline and service time.

* * * * *